United States Patent [19]

Butler

[11] 3,898,240

[45] Aug. 5, 1975

[54] ALPHA-AMINO-OMEGA-ARALKYLIMINO PENICILLANIC ACIDS

[75] Inventor: Kenneth Butler, Old Lyme, Conn.

[73] Assignee: Pfizer Inc., New York, N.Y.

[22] Filed: May 25, 1971

[21] Appl. No.: 146,786

[52] U.S. Cl.......... 260/306.7 C; 260/239.1; 424/271
[51] Int. Cl............................................. C07d 99/10
[58] Field of Search.................................. 260/239.1

[56] References Cited

UNITED STATES PATENTS 3,454,557 7/1969 Patchett et al.................. 260/239.1
3,479,401 11/1969 Patchett et al.................. 260/239.1

*Primary Examiner*—Nicholas S. Rizzo
*Attorney, Agent, or Firm*—Connolly and Hutz

[57] ABSTRACT

New 6-[α-(amino)aralkylideneimino]penicillanic acid broad spectrum antibiotics and derivatives and salts thereof.

11 Claims, No Drawings

ALPHA-AMINO-OMEGA-ARALKYLIMINO PENICILLANIC ACIDS

BACKGROUND OF THE INVENTION

This invention relates to a novel series of chemotherapeutic agents, and in particular to a series of 6-[α-(amino)aralkylideneimino]penicillanic acids and to esters and salts thereof, possessing high antibacterial activity following oral administration.

The compounds in the group belonging to the family of penicillins differ from each other in the nature of the R variable and possess the general formula indicated below wherein the acyl moiety on the 6-aminopenicillanic acid is derived from a carboxylic acid or functional derivative thereof such as an acyl chloride or anhydride.

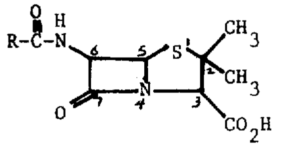

The pharmacodynamic and antibiotic properties of a given penicillin are determined to a great extent by the nature of the R group. The most widely used penicillins are those wherein the R moiety is represented by benzyl, phenoxymethyl- and α-phenoxyethyl-. While these well-known analogs are highly aantagonistic toward gram-positive micro-organisms they have limited gram-negative activity. Consequently, drugs which will combat rise in gram-negative infections, e.g., *E. coli*, are of value to the medical profession.

Recent efforts to improve the profile of activity within the family of penicillins has resulted in the synthesis of α-carboxybenzylpenicillin (U.S. Pat. No. 3,142,673), a broad spectrum antibiotic with greater efficacy against gram-negative infections via the parenteral route of administration. More recently, broad spectrum activity has been claimed for a series of 6-[α-(guanyl)thienylacetamide]penicillanic acids in British Patent 1,164,457 and for a series of 6-[α-guanylureido)phenylacetamide]penicillanic acids, Belgium Specification 742,423.

SUMMARY OF THE INVENTION

The novel antibacterial 6-[α-(amino)aralkylideneimino]penicillanic acids of the instant invention are represented by the formula:

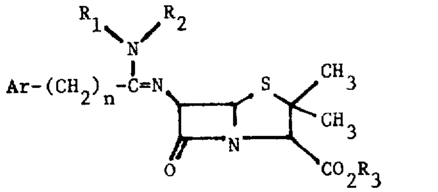

where:

Ar is phenyl, furyl or thienyl; *n* is an integer of from 0 to 2; $R_1$ and $R_2$ when considered separately are each alkyl containing 1 to 5 carbon atoms; $R_1$ and $R_2$ when taken together with the nitrogen atom to which they are attached form a heterocyclic ring of the formula:

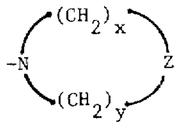

wherein *x* and *y* are integers of from 1 to 3; and Z is $CH_2$, O, S, or N–$R_4$ wherein $R_4$ is selected from the group consisting of hydrogen, benzoyl, phenyl, alkyl containing 1 to 4 carbon atoms, alkanoyl and alkylsulfonyl each containing 1 to 4 carbon atoms and carboalkoxy containing from 2 to 5 carbon atoms; $R_3$ is hydrogen, alkyl containing 1 to 4 carbon atoms, phenacyl or 1-alkanoyloxyalkyl where said alkanoyl contains 2 to 5 carbon atoms and said alkyl contains 1 to 4 carbon atoms; pharmaceutically acceptable acid addition salts thereof; and pharmaceutically acceptable basic salts wherein $R_3$ is hydrogen.

A preferred group of congeners are those wherein Ar is phenyl, *n* is 1, $R_1$ and $R_2$ are each alkyl containing from 1 to 5 carbon atoms and $R_3$ is either hydrogen or 1-alkanoyloxyalkyl where said alkanoyl contains from 2 to 5 carbon atoms and said alkyl contains from 1 to 4 carbon atoms.

A second preferred group of compounds are those wherein Ar is phenyl, *n* is 1, $R_1$ and $R_2$ when taken together with the nitrogen to which they are attached form a morpholino or N-methyl piperidino ring and $R_3$ is either phenacyl or 1-alkanoyloxyalkyl where said alkanoyl contains from 2 to 5 carbon atoms and said alkyl contains from 1 to 4 carbon atoms.

Also within the scope of the instant invention are congeners wherein $R_1$ is alkyl and $R_2$ is hydrogen or alkyl and wherein $R_1$ and $R_2$ taken together are N-phenylpiperazine wherein the phenyl moiety is substituted by simple substituents usually found on benzene rings, e.g., alkyl, alkoxy, halo, etc.

DETAILED DESCRIPTION OF THE INVENTION

The novel and valuable compounds of the present invention are prepared from the corresponding penicillin esters as illustrated:

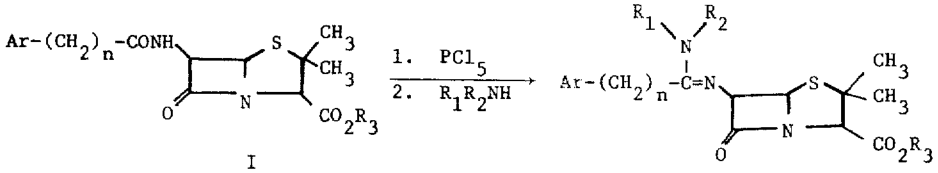

I

II wherein Ar, *n*, $R_1$ and $R_2$ are as previously indicated, and $R_3$ is alkyl, phenacyl or 1-alkanoyloxyalkyl.

Treatment of compounds of formula I with phosphorous pentachloride results in the formation of the corresponding imino chloride. Treatment of this product with the secondary amine, $R_1R_2NH$, provides the preparation of the final products of the instant invention, as illustrated above.

In practice, a solution of the appropriate penicillin ester in an aprotic solvent, e.g., chloroform or methylene chloride, and cooled to 0°–5° C., is treated with at least an equimolar amount of phosphorous pentachloride and approximately four equivalents of pyridine. The described reaction is facile and requires 15–30 minutes at ice-bath temperatures. It is advantageous, because of the lability of iminochlorides, to use the product without isolation or purification. Following this procedure, the solution of the product is washed with water, dried over sodium sulfate and treated, in the cold, with the requiside secondary amine. At least two molar equivalents of amine are employed, plus as much as a 10 percent excess. The reaction is completed in 30–90 minutes at ice-bath temperatures, and the product is isolated by addition of water and subsequent extraction of the product, as the hydrochloride salt, into the water-immiscible reaction solvent.

The acid addition salts of the products of the instant invention represent compounds of varying degrees of lipophylicity and consequently varying degrees of solubility in aqueous and nonaqueous solvents. As one skilled in the art appreciates, as the lipophylicity of the products increases the acid addition salts thereof display a dimished solubility in water or aqueous systems in favor of organic solvent systems, while the converse is true as lipophilicity decreases. In those instances wherein the salt of the product has greater solubility in the aqueous phase, said aqueous solution is made alkaline using a sodium hydroxide solution and the product as the free base extracted into an appropriate water-immiscible solvent such as benzene, methylene chloride or chloroform.

Compounds of the present invention of formula II wherein $R_3$ is hydrogen are prepared from the corresponding phenacyl esters $$(R_3 = \phi\underset{\underset{O}{\|}}{C}CH_2-)$$

using an exchange reaction employing thiophenoxide ion as the nucleophile:

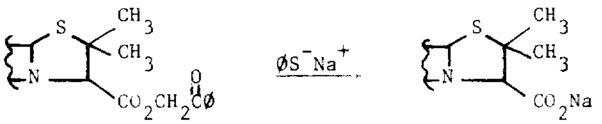

Experimentally, a solution of the requisite phenacyl ester in a highly polar solvent such as dimethylformamide or hexamethylphosphoramide is treated with an equimolar quantity of sodium thiophenoxide. At ambient temperatures the reaction is complete in 30–60 minutes and the product is isolated by dilution with a non-polar solvent such as diethyl ether. The precipitated sodium salt is washed free of reaction solvent using additional quantities of ether.

The starting reagents leading to the products of the present invention are easily prepared by methods known to those skilled in the art. The penicillin esters are prepared from the corresponding penicillins via alkylation of the carboxyl group as taught by Jansen, et. al., *J. Chem. Soc.*, 3733 (1953) and 2127 (1965). Penicillins are conveniently formed through the acylation of 6-aminopenicillanic acid with the requisite acid halide or acid in the presence of N,N'-dicyclohexylcarbodiimide as taught by Doyle, et al., *J. Chem. Soc.*, 1453 (1962) and Hobbs, et al., *J. Med. Chem.*, 4, 207 (1961), respectively. The 1-alkanoyloxyalkyl halides employed for the alkylation of the aforementioned penicillins are either commercially available or can be synthesized according to the general procedure of Ulich, et al., *J. Am. Chem. Soc.*; 43, 660 (1921) and Euranto, et. al., *Acta. Chem. Scand.*, 20, 1273 (1966).

As has been previously noted, a characteristic feature of the acidic compounds of the instant invention, i.e., wherein $R_3$ is hydrogen, is their ability to form basic salts. Acid congeners of the present invention are converted to basic salts by the interaction of said acid with an appropriate base in an aqueous or nonaqueous medium. Such basic reagents suitably employed in the preparation of said salts can vary in nature, and are meant to contemplate such bases as organic amines, ammonia, alkali metal hydroxides, carbonates, bicarbonates, hydrides and alkoxides, as well as alkali earth metal hydroxides, hydrides, alkoxides and carbonates. Representative of such bases are ammonia, primary amines such as n-propylamine, n-butylamine, aniline, cyclohexylamine, benzylamine, p-toluidine, ethylamine, octylamine, secondary amines such as dicyclohexylamine and tertiary amines such as diethylaniline, N-methylpyrrolidine, N-methylmorpholine and 1,5-diazabicyclo-[4,3,0]-5-nonene; sodium hydroxide, potassium hydroxide, ammonium hydroxide, sodium ethoxide, potassium methoxide, magnesium hydroxide, calcium hydride and barium hydroxide.

In the utilization of the chemotherapeutic activity of those compounds of the present invention which form basic salts, it is preferred, of course, to use pharmaceutically acceptable salts. Although water insolubility, high toxicity, or lack of crystalline nature may make some salt species unsuitable or less desirable for use as such in a given pharmaceutical application, the water insoluble or toxic salts can be converted to the corresponding acids by decomposition of the salts as described above, or alternately they can be converted to any desired pharmaceutically acceptable basic salt. The said pharmaceutically acceptable salts preferred include the sodium aluminum, potassium, calcium, magnesium, ammonium and substituted ammonium salts, e.g., procaine, dibenzylamine, N,N'-dibenzylethylenediamine, N,N-bis(dehydroabietyl)ethylenediamine, 1-ephenamine, N-ethylpiperidine, N-benzyl-β-phenethylamine, triethylamine, as well as salts with other amines which have been used to form salts with benzylpenicillin.

As has been previously mentioned, the basic compounds of the present invention can be converted to the acid addition salts by interaction of the base with an acid either in an aqueous or nonaqueous medium. In a similar manner, treatment of the acid addition salts with an equivalent amount of an aqueous base solution, e.g., alkali metal hydroxides, alkali metal carbonates and alkali metal bicarbonates or with an equivalent amount of a metal cation which forms an insoluble precipitate with the acid anion, results in a regeneration of the free base form. Such conversions are best carried out as rapidly as possible and under temperature conditions and method dictated by the stability of said basic products. The bases thus regenerated may be recovered to the same or a different acid addition salt.

In the utilization of the chemotherapeutic activity of those compounds of the present invention which form salts, it is preferred, of course, to use pharmaceutically acceptable salts. Although water insolubility, high toxicity, or lack of crystalline nature may make some particular salt species unsuitable or less desirable for use as such in a given pharmaceutical application, the water insoluble or toxic salts can be converted to the corresponding pharmaceutically acceptable bases by decomposition of the salt as described above, or alterately they can be converted to any desired pharmaceutically acceptable acid addition salt.

Examples of acids which provide pharmaceutically acceptable anions are hydrochloric, hydrobromic, hydroiodic, nitric, sulfuric, or sulfurous, phosphoric, acetic, lactic, citric, tartaric, succinic, maleic, and gluconic acids.

The novel penicillins described herein exhibit in vitro activity against a wide variety of micro-organisms, including both gram-positive and gram-negative bacteria. Their useful activity can readily be demonstrated by in vitro tests against various organisms in a brain-heart infusion medium by the usual two-fold serial dilution technique. The in vitro activity of the herein described compounds renders them useful for topical application in the form of ointments, creams and the like, or for sterilization purposes, e.g., sick-room utensils.

These novel penicillins are also effective antibacterial agents in vivo in animals, including man, not only via the parenteral route of administration but also by the oral route of administration.

Obviously, the physician will ultimately determine the dosage which will be most suitable for a particular individual person, and it will vary with the age, weight and response of the particular patient as well as with the nature and extent of the symptoms and the pharmacodynamic characteristics of the particular agent to be administered. It will often be found that when the composition is administered orally, larger quantities of the active ingredient will be required to produce the same level as produced by a small quantity administered parenterally.

Having full regard for the foregoing factors it is considered that an effective daily oral dose of the compounds of the present invention in humans of approximately 10–200 mg./kg. per day, with a preferred range of about 50–150 mg./kg. per day in single or divided doses, and a parenteral dose of 20–100 mg./kg. per day, with a preferred range of about 30–80 mg./kg. will effectively alleviate the symptoms of the infection. These values are illustrative, and there may, of course, be individual cases where higher or lower dose ranges are merited.

Many of the penicillin ester compounds of this invention exhibit improved absorption on oral administration over that produced by the corresponding free acid or alkali metal salt forms. They, therefore, represent convenient and effective dosage forms of 6-[α-(amino)aralkylideneimino]penicillanic acids.

Further, many of the esters described herein, although inactive or of relatively low activity against gram-negative organisms per se are, when administered orally to animals, including man, metabolized to the parent acid, which has a wide spectrum of activity against gram-positive and gram-negative bacteria. They thus serve as pro-drug forms of the parent compounds since they are biologically converted in vivo to said compounds. The rate of metabolic conversion of such esters to the parent acid occurs at such a rate as to provide an effective and prolonged concentration of the parent acid in the animal body. In effect, such esters act as depot sources for the parent acid.

The preferred 6-[α-(amino)aralkylideneimino]-penicillanic acids of the present invention are 6-([α-(dimethylamino)phenethylideneimino]penicillanic acid, pivaloyloxymethyl ester, 6-[α-(dimethylamino)phenethylideneimino]penicillanic acid, 6-[α-(4-morpholinyl)phenethylideneimino]pencillanic acid, pivaloyoxymethyl ester, 6-[α-(4-methyl-1-piperazinyl)phenethylideneimino]penicillanic acid, pivaloyloxymethyl ester, 6-[α-(4-methyl-1-piperazinyl)phenethylideneimino]penicillanic acid, acetoxymethyl ester and 6-[α-(4-morpholinyl)phenethylideneimino]penicillanic acid, phenacyl ester.

The antimicrobial spectra of 6-[α-(4-morpholinyl)phenethylideneimino]penicillanic acid, acetoxymethyl ester against several bacteria is presented below in Table I. The tests were run under standardized conditions in which nutrient broth containing various concentrations of the test material was seeded with the particular organism specified, and the minimum concentration (MIC) at which growth of each organism failed to occur was observed and recorded.

TABLE I

In vitro Data of 6-[α-(4-Morpholinyl)phenethylideneimino]-penicillanic acid, acetoxymethyl ester (MIC; mcg./ml.)

| Organism | MIC |
|---|---|
| Staphylococcus aureus 006 | 0.8 |
| Streptococcus pyogenes | 0.01 |
| Pasteurella multocida | 6 |
| Hemophilus influenzae | 25 |
| Staphylococcus aureus 005 | 0.2 |
| Ery. insidiosa | 0.4 |

Tables II and IIA present in vivo data for 6-[α-(4-methyl-1-piperazinyl)phenethylideneimino]penicillanic acid, acetoxymethyl ester and 6-[α-(1-piperidyl)phenethylideneimino]penicillanic acid, phenacyl ester, respectively, against several experimental infections in mice.

The values (survivors/total number of infected mice) are obtained under standard conditions known to those skilled in the art. The test compound is administered to the infected mice by a multiple dosing regimen in which the first dose is given 0.5 hour after inoculation and is repeated four and twenty-four hours later.

TABLE II

In vivo Data for 6-[α-(4-methyl-1-piperazinyl)phenethylideneimino]penicillanic acid, acetoxymethyl ester vs. several bacterial infections in mice*

| | E. coli 266 | | Staph. aureus 005 | |
|---|---|---|---|---|
| Dose (mg./kg.) | PO | SQ | PO | SQ |
| 200 | 2/10 | 4/10 | 5/10 | 5/10 |
| 50 | 2/10 | 1/10 | 1/10 | 4/10 |

TABLE IIA

In vivo Data for 6-[α-(1-piperidyl)phenethylideneimino]penicillanic acid, phenacyl ester vs. bacterial infections in mice*

| | E. coli 266 | | Staph. aureus 005 | |
|---|---|---|---|---|
| Dose (mg./kg.) | PO | SQ | PO | SQ |
| 200 | 8/10 | 6/10 | 2/10 | 2/10 |
| 50 | 6/10 | 3/10 | 1/10 | 0/10 |

*PO = oral; SQ = subcutaneous route of administration. Ratio of survivors/total mice.

The novel products of this invention are of value as antibacterial agents and are remarkably effective in treating a number of infections caused by susceptible gram-negative and gram-positive bacteria in poultry and animals including man. For such purposes, the pure materials or mixtures thereof with other antibiotics can be employed. They may be administered alone or in combination with a pharmaceutical carrier on the basis of the chosen route of administration and standard pharmaceutical practice. For example, they may be administered orally in the form of tablets containing such excipients as starch, milk sugar, certain types of clay, etc., or in capsules alone or in admixture with the same or equivalent excipients. They may also be administered orally in the form of elixirs or oral suspensions which may contain flavoring or coloring agents, or be injected parenterally, that is, intramuscularly or subcutaneously. For parenteral administration, they are best used in the form of a sterile aqueous solution which may be either aqueous such as water, isotonic saline, isotonic dextrose, Ringer's solution, or non-aqueous such as fatty oils of vegetable origin (cotton seed, peanut oil, corn, sesame) and other non-aqueous vehicles which will not interfere with the therapeutic efficiency of the preparation and are nontoxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as local anesthetics and inorganic salts to afford desirable pharmacological properties.

The following examples are provided solely for the purpose of illustration and are not to be construed as limitations of this invention, many variations of which are possible without departing from the spirit or scope thereof.

EXAMPLE I

6-[α-(Dimethylamino)phenethylideneimino]penicillanic Acid, pivaloyloxymethyl ester hydrochloride A solution of 6-aminopenicillanic acid, pivaloyloxymethyl ester (2.24 g; 5 m moles) in 50 ml. of methylene chloride, cooled in an ice-bath to 0°–5° C., is treated with 1.58 g. of pyridine and phosphorous pentachloride (1.04 g.; 5 m moles). The resulting reaction mixture is allowed to stir in the cold for 15–20 minutes and is then washed with water and finally an aqueous sodium chloride solution. The organic phase, containing the imino chloride, is separated, dried over sodium sulfate and treated, again at 0°–5° C., with dimethylamine (450 mg.; 10 m moles). After allowing the reaction to proceed at ice-bath temperatures for 30 minutes, the reaction mixture is allowed to stir at room temperature for 20–30 minutes and is then added to water. The pH is adjusted to 2 with 6 N hydrochloric acid and the methylene chloride layer separated and dried over sodium sulfate. Removal of the organic solvent under reduced pressure provides the hydrochloride salt of the desired product as a yellow foam, 1.6 g. (64% yield; MIC—*S. aureus* 005: 25 mcg./ml.).

In a similar manner 6-[α-(dimethylamino)phenethylideneimino]penicillanic acid, methyl ester is prepared in 56% yield from benzyl penicillin methyl ester (MIC—*S. aureus* 005: 200 mcg./ml.).

EXAMPLE II

Starting with the appropriate penicillin ester, phosphorous pentachloride and requisite amine, and employing the procedure of Example I, the following products are synthesized:

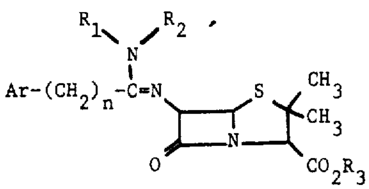

| Ar | n | $R_1$ | $R_2$ | $R_3$ |
|---|---|---|---|---|
| $C_6H_5$ | 0 | $CH_3$— | $C_2H_5$— | $CH_3$— |
| $C_6H_5$ | 0 | $C_2H_5$— | $C_2H_5$— | n—$C_3H_7$— |
| $C_6H_5$ | 0 | $C_2H_5$— | $C_2H_5$— | $C_6H_5COCH_2$— |
| $C_6H_5$ | 0 | $CH_3$— | n—$C_5H_{11}$— | $C_2H_5$— |
| $C_6H_5$ | 0 | n—$C_4H_9$— | n—$C_4H_9$— | i—$C_3H_7$— |
| $C_6H_5$ | 0 | $C_2H_5$— | $C_2H_5$— | $CH_3CO_2CH_2$— |
| $C_6H_5$ | 0 | $CH_3$— | n—$C_5H_{11}$— | $CH_3(CH_2)_2CO_2CH(CH_3)$— |
| $C_6H_5$ | 1 | $CH_3$— | $CH_3$— | n—$C_4H_9$ — |
| $C_6H_5$ | 1 | $CH_3$— | $CH_3$— | $C_6H_5COCH_2$— |
| $C_6H_5$ | 1 | $CH_3$— | $CH_3$— | —$C_4H_9$— |
| $C_6H_5$ | 1 | $CH_3$— | $C_2H_5$— | $CH_3CO_2CH(C_2H_5)$— |
| $C_6H_5$ | 1 | n—$C_3H_7$— | n—$C_3H_7$ | $CH_3(CH_2)_3CO_2CH_2$— |
| $C_6H_5$ | 1 | $CH_3$— | n—$C_5H_{11}$— | $(CH_3)_3CCO_2CH_2$— |
| $C_6H_5$ | 2 | $CH_3$— | $CH_3$— | n—$C_3H_7$— |
| $C_6H_5$ | 2 | i—$C_3H_7$— | i—$C_3H_7$— | $CH_3$— |
| $C_6H_5$ | 2 | i—$C_3H_7$— | i—$C_3H_7$— | $C_6H_5COCH_2$— |
| $C_6H_5$ | 2 | $C_2H_5$— | $C_2H_5$— | $CH_3(CH_2)_2CO_2CH(CH_3)$— |
| $C_6H_5$ | 2 | $CH_3$— | n—$C_5H_{11}$— | t—$C_4H_9$— |
| 2—$C_4H_3O$ | 0 | $CH_3$— | $CH_3$— | n—$C_3H_7$— |
| 2—$C_4H_3O$ | 0 | $CH_3$— | $CH_3$— | $C_6H_5COCH_2$— |
| 2—$C_4H_3O$ | 0 | $CH_3$— | n—$C_4H_9$— | s—$C_4H_9$— |
| 2—$C_4H_3O$ | 0 | n—$C_3H_7$— | i—$C_3H_7$— | $CH_3CO_2CH(n—C_3H_7)$— |
| 3—$C_4H_3O$ | 0 | $C_2H_5$— | $C_2H_5$— | $(CH_3)_3CCO_2CH_2$— |
| 3—$C_4H_3O$ | 0 | $CH_3$— | $CH_3$— | n—$C_3H_7$— |
| 3—$C_4H_3O$ | 0 | $CH_3$— | $CH_3$— | $C_6H_5COCH_2$— |
| 3—$C_4H_3O$ | 0 | $CH_3$— | s—$C_4H_9$— | $CH_3CO_2CH_2$— |
| 3—$C_4H_3O$ | 0 | n—$C_4H_9$— | n—$C_4H_9$— | $CH_3CH_2CO_2CH(C_2H_5)$— |
| 3—$C_4H_3O$ | 0 | n—$C_4H_9$— | n—$C_4H_9$— | $C_2H_5$— |
| 2—$C_4H_3O$ | 1 | $CH_3$— | $CH_3$— | $C_2H_5$— |
| 2—$C_4H_3O$ | 1 | $C_2H_5$— | i—$C_3H_7$— | $CH_3CO_2CH_2$— |
| 2—$C_4H_3O$ | 1 | $CH_3$— | n—$C_4H_9$— | $CH_3OC_2CH_2$— |
| 2—$C_4H_3O$ | 1 | $CH_3$— | n—$C_4H_9$— | $C_6H_5COCH_2$— |
| 2—$C_4H_3O$ | 1 | $CH_3$— | t—$C_4H_9$— | i—$C_3H_7$— |
| 3—$C_4H_3O$ | 1 | $C_2H_5$— | $CH_3$— | i—$C_4H_9$— |
| 3—$C_4H_3O$ | 1 | n—$C_3H_7$— | n—$C_4H_9$— | $CH_3CO_2CH_2$— |
| 3—$C_4H_3O$ | 1 | $CH_3$— | $C_2H_5$— | $(CH_3)_3CCO_2CH_2$— |
| 2—$C_4H_3O$ | 2 | $CH_3$— | $CH_3$— | $CH_3$— |
| 2—$C_4H_3O$ | 2 | $CH_3$— | $C_2H_5$— | $CH_3CH_2CO_2CH_2$— |
| 2—$C_4H_3O$ | 2 | $C_2H_5$— | $C_2H_5$— | $C_6H_5COCH_2$— |
| 2—$C_4H_3O$ | 2 | n—$C_4H_9$— | n—$C_3H_7$— | i—$C_3H_7$— |
| 3—$C_4H_3O$ | 2 | $C_2H_5$— | n—$C_3H_7$— | $(CH_3)_3CCO_2CH_2$— |
| 3—$C_4H_3O$ | 2 | n—$C_3H_7$ — | n—$C_3H_7$— | $(CH_3)_3CCO_2CH(CH_3)$— |
| 3—$C_4H_3O$ | 2 | $CH_3$— | s—$C_4H_9$— | $CH_3CO_2CH(i—C_3H_7)$— |
| 3—$C_4H_3O$ | 2 | t—$C_4H_9$— | s—$C_4H_9$— | $CH_3$— |
| 3—$C_4H_3O$ | 2 | $C_2H_5$— | n—$C_3H_7$— | $C_6H_5COCH_2$— |
| 2—$C_4H_3S$ | 0 | $CH_3$— | $CH_3$— | n—$C_3H_7$— |
| 2—$C_4H_3S$ | 0 | $CH_3$— | n—$C_3H_7$— | $C_6H_5COCH_2$— |
| 2—$C_4H_3S$ | 0 | $C_2H_5$— | n—$C_4H_9$— | $CH_3(CH_2)_3CO_2CH_2$— |
| 2—$C_4H_3S$ | 0 | $C_2H_5$— | $C_2H_5$— | $(CH_3)_2CHCO_2CH_2$— |
| 3—$C_4H_3S$ | 0 | $CH_3$— | $CH_3$— | $C_2H_5CH(CH_3)CO_2CH_2$— |
| 3—$C_4H_3S$ | 0 | $C_2H_5$— | n—$C_3H_7$— | n—$C_4H_9$— |
| 3—$C_4H_3S$ | 0 | $CH_3$— | t—$C_4H_9$— | $C_6H_5COCH_2$— |
| 2—$C_4H_3S$ | 1 | $CH_3$— | $C_2H_5$— | $CH_3$— |
| 2—$C_4H_3S$ | 1 | $C_2H_5$— | $C_2H_5$— | n—$C_4H_9$— |
| 2—$C_4H_3S$ | 1 | $CH_3$— | s—$C_4H_9$— | $C_6H_5COCH_2$— |
| 3—$C_4H_3S$ | 1 | $CH_3$— | $C_2H_5$— | $C_6H_5COCH_2$— |
| 3—$C_4H_3S$ | 1 | $C_2H_5$— | i—$C_3H_7$— | n—$C_4H_9$— |
| 3—$C_4H_3S$ | 1 | n—$C_4H_9$— | n—$C_4H_9$ — | $(CH_3)_2CHCO_2CH_2$— |
| 3—$C_4H_3S$ | 1 | i—$C_4H_9$— | $CH_3$— | $CH_3(CH_2)_3CO_2CH(CH_3)$— |
| 2—$C_4H_3S$ | 2 | $C_2H_5$— | $C_2H_5$— | n—$C_3H_7$— |
| 2—$C_4H_3S$ | 2 | n—$C_3H_7$— | $C_2H_5$— | $(CH_3)_2CHCO_2CH(n—C_3H_7)$— |
| 2—$C_4H_3S$ | 2 | $CH_3$— | $CH_3$— | $C_6H_5COCH_2$— |
| 3—$C_4H_3S$ | 2 | $CH_3$— | $CH_3$— | $CH_3$— |
| 3—$C_4H_3S$ | 2 | $C_2H_5$— | $C_2H_5$— | $C_6H_5COCH_2$— |
| 3—$C_4H_3S$ | 2 | $C_2H_5$— | $C_2H_5$— | $(CH_3)_3CCO_2CH_2$— |
| 3—$C_4H_3S$ | 2 | n—$C_3H_7$— | n—$C_3H_7$— | $CH_3CO_2CH(C_2H_5)$— |

EXAMPLE III

6-[α-(1-Piperidyl)phenethylideneimino]penicillanic acid, pivaloyloxymethyl ester hydrochloride To a solution of benzylpenicillin, pivaloyloxymethyl ester (2.24 g.; 5 m moles) in 50 ml. of dry methylene chloride and cooled in an ice bath is added pyridine (1.62 ml.; 20 m moles) followed by phosphorous pentachloride (1.04 g.; 5 m moles). The reaction mixture is allowed to stir for 15 minutes and is then added to water. The organic phase is separated, washed with a saturated sodium chloride solution and, finally, dried over magnesium sulfate.

The methylene chloride solution, containing the intermediate iminochloride is cooled in an ice bath and subsequently treated with piperidine (0.997 ml.; 10.0 m moles). The reaction mixture is allowed to stir for 1.5 hours in the ice bath and then 2.5 hours at room temperature followed by hydrolysis with water and adjustment of the pH to 2 with 6 N hydrochloric acid. The organic phase is separated and extracted consecutively with water, 10% sodium carbonate solution, water, aqueous acid (pH 2), water and finally, a saturated sodium chloride solution. The methylene chloride layer is then dried over magnesium sulfate and concentrated to dryness in vacuo, 1.4 g., (55% yield) (MIC *S. aureus* 005: 0.1 mcg./ml.)

In a similar manner are prepared 6-[α-(1-pyrrolidyl)phenethylideneimino]penicillanic acid, pivaloyoxymethyl ester (55% yield; MIC-*S. aureus* 005: 12 mcg./ml.) and 6-[α-(1-piperidyl)phenethylideneimino]pencillanic acid, phenacyl ester (82% yield, MIC-*S. aureus* 005: 6 mcg./ml.).

EXAMPLE IV

The procedure of Example III is repeated, starting with the appropriate reagents, to provide the following analogs: 6-[α-(1-azacycloheptyl)benzylideneimino]-penicillanic acid, ethyl ester; 6-[α-( 1-piperidyl)benzylideneimino]penicillanic acid, phenacyl ester; 6-[α-(1-pyrrolidyl)benzylideneimino]penicillanic acid, acetoxymethyl ester; 6-[α-(1-azacyclooctyl)phenethylideneimino]penicillanic acid, tert-butyl ester; 6-[α-(1-piperidyl)phenethylideneimino[penicillanic acid, 1--(acetoxy)propyl ester; 6-[α-(1-piperidyl)phenpropylideneimino]penicillanic acid, phenacyl ester; 6-[α-(1-azacycloheptyl)phenpropylideneimino]penicillanic acid, 1-(butyryloxy)ethyl ester; 6-[α-(1-piperidyl)-2-furfurylideneimino]penicillanic acid, n-butyl ester; 6-[α-(1-azacyclooctyl)-2-furfurylideneimino]penicillanic acid, 1-(acetoxy)butyl ester; 6-[α-(1-pyrrolidyl)-3-furfurylideneimino]penicillanic acid, phenacyl ester; 6-[α-(1-azetidinyl)-3-furfurylideneimino]penicillanic acid, 1-(propionyloxy)propyl ester; 6-[α-(1-pyrrolidyl)-2-furylethylideneimino]penicillanic acid, ethyl ester; 6-[α-(1-azacyclooctyl)-2-furylethylideneimino]penicillanic acid, phenacyl ester; 6-[α-(1-piperidyl)-2-furylethylideneimino]penicillanic acid, acetoxymethyl ester; 6-[α-(1-azetidyl)-2-furylpropylideneimino]penicillanic acid, isobutyl ester; 6-[α-(1-azacycloheptyl)-2-furylpropylideneimino]penicillanic acid, phenacyl ester; 6-[α-(1-azetidyl)-3-furylpropylideneimino]penicillanic acid, methyl ester; -[α-(1-azacyclooctyl)-3-furylpropylideneimino]-penicillanic acid, pivaloyloxymethyl ester; 6-[α-(pyrrolidyl)-2-thenylideneimino]penicillanic acid, n-butyl ester; 6-α-(piperidyl)-2-thenylideneimino]penicillanic acid, valeryloxymethyl ester; 6-[α-(1-azetidyl)-3-thenylideneimino]penicillanic acid, phenacyl ester; 6-[α-(1-piperidyl)-2-thienylethylideneimino]penicillanic acid, methyl ester; 6-[α-(1-piperidyl)-2-thienylideneimino]penicillanic acid, phenacyl ester; 6-[α-(1-pyrrolidyl)-3-thienylethylideneimino]penicillanic acid, n-butyl ester; 6-[α-(1-azacylclooctyl)-3-thienylethylideneimino]penicillanic acid, isobutyryloxymethyl ester; 6-[α-(1-azetidyl)-2-thienylpropylideneimino]penicillanic acid, n-propyl ester; 6-[α-(1-azacycloheptyl)-3-thienylpropylideneimino]-penicillanic acid, methyl ester; and 6-[α-(1-piperidyl)-3-thienylpropylideneimino]penicillanic acid, phenacyl ester.

EXAMPLE V

6-[α-(4-Morpholinyl)phenethylideneimino]penicillanic acid, acetoxymethyl ester

To 30 ml. of methylene cloride, cooled in an ice bath and under a nitrogen atmosphere, is added benzylpenicillin acetoxymethyl ester (2.0 g.; 4.9 m moles) followed by pyridine (1.59 ml. 19.7 m moles) and phosphorous pentachloride (1.025 g.; 4.92 m moles). The reaction mixture is allowed to stir for 30 minutes and is then washed with water and dried over sodium sulfate.

To the methylene chloride is added morpholine (0.86 ml.; 9.84 m moles) and the reaction allowed to stir in an ice bath for one hour and then at room temperature for 1.5 hours. The reaction mixture is then extracted with 2 × 50 ml. of water, the final wash being adjusted to pH 1 with 2N hydrochloric acid. The aqueous acid layer is separated, the pH adjusted to 7 with sodium bicarbonate and the product extracted with methylene chloride. The organic phase is separated, dried over sodium sulfate and concentrated under reduced pressure to provide the product as a yellow foam, 1.71 g. (75% yield).

In a similar manner are prepared 6-[α-(4-morpholinyl)phenethylideneimino]penicillanic acid, pivaloyloxymethyl ester (80% yield; MIC-*S. aureus* 005: 0.1 mcg./ml.) and 6-[α-(4-morpholinyl)phenethylideneimino]penicillanic acid, phenacyl ester (80% yield; MIC-*S. aureus* 005: 0.2 mcg./ml.).

EXAMPLE VI

Starting with the requisite penicillin ester, and secondary amine and following the procedure of Example V, the following congeners are synthesized:

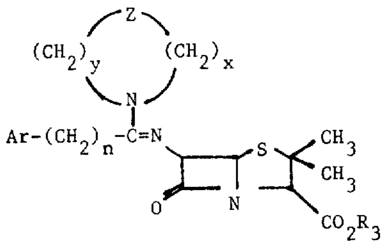

| Ar | n | x | y | Z | $R_3$ |
|---|---|---|---|---|---|
| $C_6H_5$ | 0 | 1 | 1 | 0 | $CH_3$— |
| $C_6H_5$ | 0 | 1 | 2 | O | $C_2H_5$— |
| $C_6H_5$ | 0 | 1 | 2 | S | $C_2H_5$— |
| $C_6H_5$ | 0 | 2 | 2 | O | $(CH_3)_3CCO_2CH_2$— |
| $C_6H_5$ | 0 | 2 | 2 | S | $CH_3CO_2CH_2$— |

–Continued

| Ar | n | x | y | Z | $R_3$ |
|---|---|---|---|---|---|
| $C_6H_5$ | 0 | 2 | 2 | S | n—$C_4H_9$— |
| $C_6H_5$ | 0 | 3 | 1 | O | $CH_3$— |
| $C_6H_5$ | 0 | 3 | 2 | O | $C_6H_5COCH_2$— |
| $C_6H_5$ | 0 | 3 | 2 | S | i—$C_3H_7$— |
| $C_6H_5$ | 0 | 3 | 3 | O | $C_2H_5$— |
| $C_6H_5$ | 1 | 1 | 2 | O | n—$C_4H_9$— |
| $C_6H_5$ | 1 | 2 | 2 | O | t—$C_4H_9$— |
| $C_6H_5$ | 1 | 2 | 2 | S | $C_6H_5COCH_2$— |
| $C_6H_5$ | 1 | 2 | 2 | S | $CH_3(CH_2)_3CO_2CH_2$— |
| $C_6H_5$ | 1 | 2 | 3 | O | n—$C_4H_9$— |
| $C_6H_5$ | 2 | 1 | 1 | O | $CH_3$— |
| $C_6H_5$ | 2 | 2 | 2 | O | n—$C_3H_7$— |
| $C_6H_5$ | 2 | 3 | 2 | S | $CH_3(CH_2)_2CO_2CH(CH_3)$— |
| $C_6H_5$ | 2 | 3 | 3 | O | $CH_3$— |
| $C_6H_5$ | 2 | 3 | 3 | S | $CH_3$— |
| 2—$C_4H_3O$ | 0 | 1 | 1 | O | n—$C_3H_7$— |
| 2—$C_4H_3O$ | 0 | 1 | 3 | S | s—$C_4H_9$— |
| 2—$C_4H_3O$ | 0 | 2 | 3 | O | n—$C_3H_7$— |
| 2—$C_4H_3O$ | 0 | 2 | 2 | O | n—$C_3H_7$— |
| 2—$C_4H_3O$ | 0 | 2 | 2 | S | n—$C_3H_7$— |
| 3—$C_4H_3O$ | 0 | 2 | 2 | S | $(CH_3)_3CCO_2CH_2$— |
| 3—$C_4H_3O$ | 0 | 2 | 2 | S | $C_6H_5COCH_2$— |
| 3—$C_4H_3O$ | 0 | 2 | 2 | O | $C_6H_5COCH_2$— |
| 3—$C_4H_3O$ | 0 | 3 | 3 | O | $CH_3CO_2CH_2$— |
| 3—$C_4H_3O$ | 0 | 3 | 3 | O | $C_2H_5$— |
| 2—$C_4H_3O$ | 1 | 1 | 2 | O | $C_2H_5$— |
| 2—$C_4H_3O$ | 1 | 2 | 2 | O | $C_2H_5$— |
| 2—$C_4H_3O$ | 1 | 2 | 2 | S | $C_2H_5$— |
| 2—$C_4H_3O$ | 1 | 2 | 3 | O | $C_2H_5$— |
| 3—$C_4H_3O$ | 1 | 1 | 2 | O | $CH_3CO_2CH_2$— |
| 3—$C_4H_3O$ | 1 | 1 | 3 | O | i—$C_4H_9$— |
| 3—$C_4H_3O$ | 1 | 2 | 2 | S | i—$C_4H_9$— |
| 3—$C_4H_3O$ | 1 | 2 | 2 | O | $CH_3CO_2CH_2$— |
| 3—$C_4H_3O$ | 1 | 3 | 3 | O | $(CH_3)_3CCO_2CH_2$— |
| 2—$C_4H_3O$ | 2 | 1 | 2 | S | $Ch_3CH_2CO_2CH_2$— |
| 2—$C_4H_3O$ | 2 | 2 | 2 | O | $C_6H_5COCH_2$— |
| 2—$C_4H_3O$ | 2 | 2 | 2 | S | $CH_3$— |
| 2—$C_4H_3O$ | 2 | 2 | 2 | O | $CH_3$— |
| 3—$C_4H_3O$ | 2 | 2 | 2 | O | $(CH_3)_3CCO_2CH(CH_3)$— |
| 3—$C_4H_3O$ | 2 | 2 | 2 | S | $(CH_3)_3CCO_2CH(CH_3)$— |
| 3—$C_4H_3O$ | 2 | 2 | 2 | O | $CH_3$— |
| 3—$C_4H_3O$ | 2 | 2 | 2 | S | $CH_3$— |
| 2—$C_4H_3S$ | 0 | 1 | 3 | O | n—$C_3H_7$— |
| 2—$C_4H_3S$ | 0 | 2 | 3 | O | n—$C_3H_7$— |
| 2—$C_4H_3S$ | 0 | 2 | 3 | S | $CH_3(CH_2)_3CO_2CH_2$— |
| 2—$C_4H_3S$ | 0 | 3 | 3 | O | n—$C_3H_7$— |
| 3—$C_4H_3S$ | 0 | 2 | 2 | O | $C_2H_5CH(CH_3)CO_2CH_2$— |
| 3—$C_4H_3S$ | 0 | 2 | 2 | O | n—$C_4H_9$— |
| 3—$C_4H_3S$ | 0 | 2 | 2 | S | n—$C_4H_9$— |
| 2—$C_4H_3S$ | 1 | 1 | 1 | O | $CH_3$— |
| 2—$C_4H_3S$ | 1 | 1 | 2 | O | $CH_3$— |
| 2—$C_4H_3S$ | 1 | 2 | 2 | S | $CH_3$— |
| 2—$C_4H_3S$ | 1 | 3 | 2 | S | $C_6H_5COCH_2$— |
| 2—$C_4H_3S$ | 1 | 3 | 3 | O | n—$C_4H_9$— |
| 3—$C_4H_3S$ | 1 | 2 | 3 | O | n—$C_4H_9$— |
| 3—$C_4H_3S$ | 1 | 3 | 3 | O | $(CH_3)_2CHCO_2CH_2$— |
| 3—$C_4H_3S$ | 1 | 3 | 3 | O | $CH_3(CH_2)_3CO_2CH(CH_3)$— |
| 3—$C_4H_3S$ | 1 | 3 | 3 | S | $CH_3(CH_2)_3CO_2CH(CH_3)$— |
| 2—$C_4H_3S$ | 2 | 1 | 2 | O | n—$C_3H_7$— |
| 2—$C_4H_3S$ | 2 | 1 | 2 | S | n—$C_3H_7$— |
| 2—$C_4H_3S$ | 2 | 2 | 2 | O | $(CH_3)_2CHCO_2CH$(n—$C_3H_7$)— |
| 2—$C_4H_3S$ | 2 | 2 | 2 | S | $C_6H_5COCH_2$— |
| 3—$C_4H_3S$ | 2 | 1 | 3 | O | $CH_3$— |
| 3—$C_4H_3S$ | 2 | 1 | 3 | O | $C_6H_5COCH_2$— |
| 3—$C_4H_3S$ | 2 | 2 | 3 | O | $(CH_3)_3CCO_2CH_2$— |
| 3—$C_4H_3S$ | 2 | 3 | 3 | S | $CH_3CO_2CH(C_2H_5)$— |

EXAMPLE VII

6-[α-(4-Methylpiperazinyl)phenethylideneimino]-penicillanic acid, acetoxymethyl ester To benzyl penicillin acetoxymethyl ester (2.0 g.; 4.9 m moles) in 30 ml. of dry methylene chloride cooled to 30° C. is added pyridine (1.6 ml.; 19.6 m moles) and phosphorous pentachloride (1.0 g.; 4.9 m moles), and the resulting reaction mixture allowed to stir at ice bath temperatures for 30 minutes. Water is added and the organic phase separated and dried over sodium sulfate. The dried solvent, containing the intermediate imino chloride, is cooled in an ice bath and treated with 1-methylpiperazine (980 mg.; 9.8 m moles). Cooling is continued for 1 hour, after which the reaction is allowed to warm to room temperature where it is maintained for 1 hour. The reaction solvent is washed with water, the pH adjusted to 1 with 2 N hydrochloric acid and extracted once again with water. The aqueous layers are combined, layered under with methylene chloride and the pH adjusted to 7 with a saturated solution of sodium bicarbonate. The organic phase is separated, dried over sodium sulfate and concentrated in vacuo to a yellow foam, 1.3 g. (55% yield) (MIC-*S. aureus* 005: 1.5 mcg./ml.).

In a similar manner are synthesized 6-[α-(4-methylpiperazinyl)phenethylideneimino]penicillanic acid, pivaloyloxymethyl ester (83% yield; MIC-*S. aureus* 005: 1.5 mcg./ml.) and 6-[α-(4-methylpiperazinyl)phenethylideneimino]penicillanic acid, methyl ester (50% yield; MIC-*S. aureus* 005: 12.5 mcg./ml.).

EXAMPLE VIII

Employing the procedure of Example VII and starting with the appropriate penicillin ester and amine, the following compounds are synthesized:

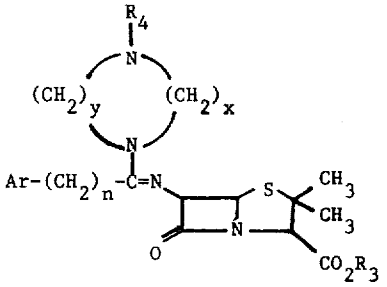

| Ar | n | x | y | $R_4$ | $R_3$ |
|---|---|---|---|---|---|
| $C_6H_5$ | 0 | 1 | 2 | H— | $CH_3$— |
| $C_6H_5$ | 0 | 2 | 2 | $C_2H_5$— | n—$C_3H_7$— |
| $C_6H_5$ | 0 | 2 | 2 | $CH_3OCO$— | $CH_3$— |
| $C_6H_5$ | 0 | 2 | 2 | n—$C_4H_9OCO$— | $CH_3CO_2CH_2$— |
| $C_6H_5$ | 0 | 2 | 3 | $C_6H_5$— | $C_2H_5$— |
| $C_6H_5$ | 0 | 3 | 3 | $CH_3SO_2$— | $C_2H_5$— |
| $C_6H_5$ | 1 | 1 | 1 | n—$C_3H_7CO$— | n—$C_4H_9$— |
| $C_6H_5$ | 1 | 2 | 2 | $C_6H_5CO$— | n—$C_4H_9$— |
| $C_6H_5$ | 1 | 2 | 2 | n—$C_3H_7SO_2$— | $C_6H_5COCH_2$— |
| $C_6H_5$ | 1 | 2 | 2 | $(CH_3)_2CHOCO$— | $(CH_3)_3CCO_2CH_2$— |
| $C_6H_5$ | 1 | 3 | 3 | n—$C_4H_9$— | t—$C_4H_9$— |

–Continued

| Ar | n | x | y | $R_4$ | $R_3$ |
|---|---|---|---|---|---|
| $C_6H_5$ | 1 | 3 | 3 | H— | $CH_3CO_2CH(C_2H_5)$— |
| $C_6H_5$ | 2 | 2 | 2 | H— | n—$C_3H_7$— |
| $C_6H_5$ | 2 | 2 | 2 | n—$C_4H_9OCO$— | $CH_3$— |
| $C_6H_5$ | 2 | 2 | 2 | $CH_3SO_2$— | $CH_3(CH_2)_2CO_2CH(CH_3)$— |
| $C_6H_5$ | 2 | 3 | 2 | n—$C_3H_7CO$— | $C_6H_5COCH_2$— |
| $C_6H_5$ | 2 | 3 | 3 | $CH_3OCO$— | t—$C_4H_9$— |
| 2—$C_4H_3O$ | 0 | 1 | 1 | $CH_3SO_2$— | n—$C_3H_7$— |
| 2—$C_4H_3O$ | 0 | 2 | 2 | $C_6H_5CO$— | $CH_3CO_2CH$(n—$C_3H_7$)— |
| 2—$C_4H_3O$ | 0 | 2 | 2 | $C_6H_5$— | $(CH_3)_3CCO_2CH_2$— |
| 2—$C_4H_3O$ | 0 | 2 | 2 | n—$C_3H_7SO_2$— | $(CH_3)_3CCO_2CH_2$— |
| 2—$C_4H_3O$ | 0 | 2 | 3 | $(CH_3)_2CHOCO$— | s—$C_4H_9$— |
| 3—$C_4H_3O$ | 0 | 2 | 2 | n—$C_4H_9$— | n—$C_3H_7$— |
| 3—$C_4H_3O$ | 0 | 2 | 2 | H— | $C_6H_5COCH_2$— |
| 3—$C_4H_3O$ | 0 | 2 | 2 | $CH_3$— | $CH_3CO_2CH_2$— |
| 3—$C_4H_3O$ | 0 | 2 | 3 | $CH_3$— | $C_2H_5$— |
| 3—$C_4H_3O$ | 0 | 3 | 3 | $CH_3OCO$— | $CH_3CH_2CO_2CH(C_2H_5)$— |
| 2—$C_4H_3O$ | 1 | 1 | 2 | n—$C_4H_9$— | $C_2H_5$— |
| 2—$C_4H_3O$ | 1 | 1 | 2 | n—$C_4H_9OCO$— | $CH_3CO_2CH_2$— |
| 2—$C_4H_3O$ | 1 | 2 | 2 | H— | $C_6H_5COCH_2$— |
| 2—$C_4H_3O$ | 1 | 2 | 2 | $CH_3$— | i—$C_3H_7$— |
| 2—$C_4H_3O$ | 1 | 3 | 2 | n—$C_3H_7SO_2$— | i—$C_3H_7$— |
| 3—$C_4H_3O$ | 1 | 2 | 2 | H— | $(CH_3)_3CCO_2CH_2$— |
| 3—$C_4H_3O$ | 1 | 2 | 2 | $C_6H_5CO$— | $CH_3$— |
| 3—$C_4H_3O$ | 1 | 3 | 3 | $CH_3SO_2$— | i—$C_4H_9$— |
| 2—$C_4H_3O$ | 2 | 1 | 1 | $CH_3CO$— | $CH_3$— |
| 2—$C_4H_3O$ | 2 | 1 | 1 | $CH_3CO$— | $CH_3CH_2CO_2CH_2$— |
| 2—$C_4H_3O$ | 2 | 3 | 2 | $C_2H_5$— | $C_6H_5COCH_2$— |
| 3—$C_4H_3O$ | 2 | 2 | 2 | $C_2H_5$— | $C_6H_5COCH_2$— |
| 3—$C_4H_3O$ | 2 | 2 | 3 | H— | $(CH_3)_3CCO_2CH(CH_3)$— |
| 3—$C_4H_3O$ | 2 | 3 | 3 | n—$C_4H_9$— | $CH_3$— |
| 3—$C_4H_3O$ | 2 | 2 | 2 | t—$C_4H_9$— | $CH_3$— |
| 2—$C_4H_3S$ | 0 | 1 | 2 | $CH_3SO_2$— | n—$C_3H_7$— |
| 2—$C_4H_3S$ | 0 | 1 | 2 | $C_6H_5CO$— | $C_6H_5COCH_2$— |
| 2—$C_4H_3S$ | 0 | 2 | 2 | n—$C_4H_9OCO$— | n—$C_3H_7$— |
| 2—$C_4H_3S$ | 0 | 2 | 2 | $CH_3OCO$— | n—$C_3H_7$— |
| 2—$C_4H_3S$ | 0 | 3 | 3 | n—$C_3H_7CO$— | n—$C_3H_7$— |
| 3—$C_4H_3S$ | 0 | 2 | 2 | $C_2H_5$— | n—$C_4H_9$— |
| 3—$C_4H_3S$ | 0 | 2 | 2 | H— | $C_2H_5CH(CH_3)CO_2CH_2$— |
| 2—$C_4H_3S$ | 1 | 3 | 2 | $C_6H_5$— | $CH_3$— |
| 2—$C_4H_3S$ | 1 | 3 | 2 | $C_6H_5$— | $C_6H_5COCH_2$— |
| 2—$C_4H_3S$ | 1 | 3 | 3 | n—$C_3H_7SO_2$— | $CH_3$— |
| 3—$C_4H_3S$ | 1 | 2 | 2 | $C_6H_5$— | n—$C_4H_9$— |
| 3—$C_4H_3S$ | 1 | 2 | 2 | $(CH_3)_2CHOCO$— | $(CH_3)_2CHCO_2CH_2$— |
| 3—$C_4H_3S$ | 1 | 2 | 2 | $CH_3OCO$— | $CH_3(CH_2)_3CO_2CH(CH_3)$— |
| 3—$C_4H_3S$ | 1 | 2 | 2 | n—$C_3H_7CO$— | n—$C_4H_9$— |
| 2—$C_4H_3S$ | 2 | 2 | 2 | $CH_3$— | n—$C_3H_7$— |
| 2—$C_4H_3S$ | 2 | 2 | 2 | $C_2H_5$— | $C_6H_5COCH_2$— |
| 2—$C_4H_3S$ | 2 | 2 | 2 | $C_6H_5CO$— | $C_6H_5COCH_2$— |
| 3—$C_4H_3S$ | 2 | 1 | 1 | $C_6H_5CO$— | $CH_3$— |
| 3—$C_4H_3S$ | 2 | 1 | 1 | $CH_3SO_2$— | $CH_3$— |
| 3—$C_4H_3S$ | 2 | 1 | 2 | $CH_3OCO$— | $CH_3$— |
| 3—$C_4H_3S$ | 2 | 2 | 2 | n—$C_3H_7SO_2$— | $CH_3$— |

EXAMPLE IX

6-[α-(4-Morpholinyl)phenethylideneimino]penicillanic acid, Sodium Salt

To 6-[α-(4-morpholinyl)phenethylideneimino]-penicillanic acid, phenacyl ester (339 mg.; 0.65 m mole) in 1 ml. of dimethylformamide is added sodium thiophenoxide (86 mg.; 0.65 m mole) and the resulting mixture allowed to stir at room temperature for 30 minutes. The reaction mixture is diluted with ethyl ether and the resulting precipitate triturated with fresh ether and filtered, 100 mg. (36% yield).

EXAMPLE X

Starting with appropriate phenacyl esters in Examples II, III, IV, VI and VIII, and employing the procedure of Example IX, the following penicillanic acid sodium salts are prepared:

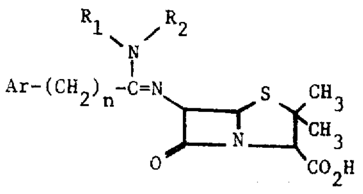

| Ar | n | $R_1$ | $R_2$ |
|---|---|---|---|
| $C_6H_5$ | 0 | $C_2H_5$— | $C_2H_5$— |
| $C_6H_5$ | 1 | $CH_3$— | $CH_3$— |
| $C_6H_5$ | 2 | i—$C_3H_7$ | i—$C_3H_7$— |
| 2—$C_4H_3O$ | 0 | $CH_3$— | $CH_3$— |
| 3—$C_4H_3O$ | 0 | $CH_3$— | $CH_3$— |
| 2—$C_4H_3O$ | 1 | $CH_3$— | n—$C_4H_9$— |
| 2—$C_4H_3O$ | 2 | $C_2H_5$— | $C_2H_5$— |
| 3—$C_4H_3O$ | 2 | $C_2H_5$— | n—$C_3H_7$— |
| 2—$C_4H_3S$ | 0 | $CH_3$— | n—$C_3H_7$— |
| 3—$C_4H_3S$ | 0 | $CH_3$— | t—$C_4H_9$— |
| 2—$C_4H_3S$ | 1 | $CH_3$— | s—$C_4H_9$— |
| 3—$C_4H_3S$ | 1 | $CH_3$— | $C_2H_5$— |
| 2—$C_4H_3S$ | 2 | $CH_3$— | $CH_3$— |
| 3—$C_4H_3S$ | 2 | $C_2H_5$— | $C_2H_5$— |
| $C_6H_5$ | 0 | —$(CH_2)_5$— | |
| $C_6H_5$ | 2 | —$(CH_2)_5$— | |
| 3—$C_4H_3O$ | 0 | —$(CH_2)_4$— | |
| 2—$C_4H_3O$ | 1 | —$(CH_2)_7$— | |
| 2—$C_4H_3O$ | 2 | —$(CH_2)_6$— | |
| 3—$C_4H_3S$ | 0 | —$(CH_2)_3$— | |
| 2—$C_4H_3S$ | 1 | —$(CH_2)_5$— | |
| 3—$C_4H_3S$ | 2 | —$(CH_2)_5$— | |
| $C_6H_5$ | 0 | —$(CH_2)_3O(CH_2)_2$— | |
| $C_6H_5$ | 1 | —$(CH_2)_2S(CH_2)_2$— | |
| 3—$C_4H_3O$ | 0 | —$(CH_2)_2S(CH_2)_2$— | |
| 3—$C_4H_3O$ | 0 | —$(CH_2)_2O(CH_2)_2$— | |
| 2—$C_4H_3O$ | 2 | —$(CH_2)_2O(CH_2)_2$— | |
| 2—$C_4H_3S$ | 1 | —$(CH_2)_3S(CH_2)_2$— | |
| B—$C_4H_3S$ | 2 | —$(CH_2)_2S(CH_2)_2$— | |
| 3—$C_4H_3S$ | 2 | —$CH_2O(CH_2)_3$— | |
| $C_6H_5$ | 1 | —$(CH_2)_2$(n—$C_3H_7SO_2$)N$(CH_2)_2$— | |
| $C_6H_5$ | 2 | —$(CH_2)_3$(n—$C_3H_7CO$)N$(CH_2)_2$— | |
| 3—$C_4H_3O$ | 0 | —$(CH_2)_2NH(CH_2)_2$— | |
| 2—$C_4H_3O$ | 1 | —$(CH_2)_2NH(CH_2)_2$— | |
| 2—$C_4H_3O$ | 2 | —$(CH_2)_3(C_2H_5)N(CH_2)_2$— | |

-Continued

| Ar | n | $R_1$ | $R_2$ |
|---|---|---|---|
| $3-C_4H_3O$ | 2 | $-(CH_2)_2(C_2H_5)N(CH_2)_2-$ | |
| $2-C_4H_3S$ | 0 | $-(CH_2)_2(C_6H_5CO)NCH_2-$ | |
| $2-C_4H_3S$ | 1 | $-(CH_2)_3(C_6H_5)N(CH_2)_2-$ | |
| $2-C_4H_3S$ | 2 | $-(CH_2)_2(C_2H_5)N(CH_2)_2-$ | |
| $2-C_4H_3S$ | 2 | $-(CH_2)_2(C_6H_5CO)N(CH_2)_2-$ | |

EXAMPLE XI

A tablet base is prepared by blending the following ingredients in the proportion by weight indicated.

| | |
|---|---|
| Sucrose, U.S.P. | 80.0 |
| Tapioca starch | 12.5 |
| Magnesium stearate | 7.5 |

Sufficient 6-[α-(dimethylamino)phenethylideneimino]penicillanic acid, pivaloyloxymethyl ester is blended into the base to provide tablets containing 25, 100 and 250 mg. of active ingredient.

EXAMPLE XII

A suspension of 6-[α-(dimethylamino)phenethylideneimino]penicillanic acid sodium salt is prepared with the following composition:

| | | |
|---|---|---|
| Penicillin compound | 31.42 | g. |
| 70% Aqueous Sorbitol | 714.29 | g. |
| Glycerine, U.S.P. | 185.35 | g. |
| Gum acacia (10% solution) | 100.00 | ml. |
| Polyvinyl pyrrolidone | 0.50 | g. |
| Propyl parahydroxybenzoate | 0.072 | g. |
| Distilled water to make one liter | 0.094 | g. |

Various sweetening and flavoring agents may be added to this suspension, as well as acceptable coloring. The suspension contains approximately 25 mg. of penicillin compound per milliliter.

EXAMAPLE XIII

Capsules containing 25, 100 and 250 mg. of active ingredient are prepared by blending sufficient 6-[α-(4-methylpiperazinyl)phenethylideneimino]penicillanic acid, pivaloyloxymethyl ester in the following mixture (proportions given in parts by weight):

| | |
|---|---|
| Calcium carbonate, U.S.P. | 17.5 |
| Dicalcium phosphate | 18.9 |
| Magnesium trisilicate | 4.2 |
| Lactose, U.S.P. | 6.2 |
| Potato starch | 5.2 |
| Magnesium stearate | 1.0 |

EXAMPLE XIV

A parenteral form of 6-[α-(4-morpholinyl)phenethylideneimino]penicillanic acid, pivaloyloxymethyl ester sodium salt is prepared by dissolving an intimate mixture of thepenicillin compound and sodium citrate (4% by weight) in sufficient polyethylene glycol 200 such that the final concentration of the penicillin compound is 25 mg. of active ingredient per milliliter. The resulting solution is sterilized by filtration and sterilely stoppered in vials.

In like manner, formulations of the products of this invention are made.

EXAMPLE XV

6-[α-(Diethylamino)benzylideneimino]penicillanic acid, Potassium Salt

To a solution of potassium hydroxide (560 mg.; 0.01 mole) in 20 ml. of water and 10 ml. of methanol is added, portionwise, 6-[α-(Diethylamino)benzylideneimino]penicillanic acid (375 g.; 0.01 mole) and the mixture is allowed to stir at room temperature until almost all the solid has dissolved. The hazy solution is filtered and the filtrate concentrated to a small volume and subsequently treated with diethyl ether. The resulting potassium salt is filtered and dried in vacuo.

In a similar manner the pharmaceutically acceptable basic salts of Example X are prepared.

EXAMAPLE XVI

6-[α-(Dimethylamino)phenethylideneimino]penicillanic acid, pivaloyloxy ester hydrobromide A methylene chloride solution of 6-[α-(dimethylamino)phenethylideneimino]penicillanic acid, pivaloyloxy ester (476 mg.; 1 m mole) is treated with sufficient gaseous hydrogen bromide to convert the free base to the hydrobromide salt. The resulting solution is concentrated to dryness in vacuo and the residue triturated with diethyl ether and filtered.

In a similar manner the products of the present invention are converted to their pharmaceutically acceptable salts.

What is claimed is:

1. A compound selected from the group consisting of penicillins having the formula:

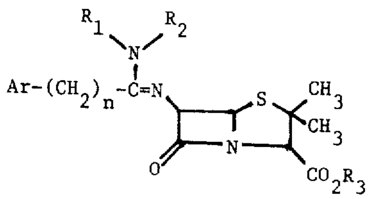

wherein:

Ar is selected from the group consisting of phenyl, furyl and thienyl;

*n* is an integer of from 0 to 2;

$R_1$ and $R_2$ when considered separately are each alkyl containing from 1 to 5 carbon atoms;

$R_1$ and $R_2$ when taken together with the nitrogen atom to which they are attached form a heterocyclic ring of the formula:

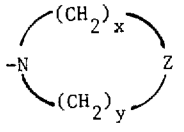

wherein *x* and *y* are integers of from 1 to 3; and Z is selected from the group consisting of $CH_2$, O, S and $N-R_4$ wherein $R_4$ is selected from the group consisting of hydrogen, phenyl, benzoyl, carboalkoxy containing from 2 to 5 carbon atoms and alkyl, alkanoyl and alkylsulfonyl each containing from 1 to 4 carbon atoms;

$R_3$ is selected from the group consisting of hydrogen, alkyl containing from 1 to 4 carbon atoms, phenacyl and 1-alkanoyloxyalkyl wherein said alkanoyl group contains from 2 to 5 carbon atoms and said alkyl contains from 1 to 4 carbon atoms;

pharmaceutically acceptable acid addition salts thereof; and pharmaceutically acceptable basic salts thereof wherein $R_3$ is hydrogen.

2. A compound of claim 1 wherein Ar is phenyl, $n$ is 1 and $R_1$ and $R_2$ are each alkyl containing from 1 to 5 carbon atoms.

3. The compound of claim 2 wherein $R_1$ and $R_2$ are each methyl and $R_3$ is $(CH_3)_3CCO_2CH_2$—.

4. The compound of claim 2 wherein $R_1$ and $R_2$ are each methyl and $R_3$ is hydrogen.

5. A compound of claim 1 wherein Ar is phenyl, $n$ is 1 and $R_1$ and $R_2$ taken together with the nitrogen atom to which they are attached form a heterocyclic ring of the formula:

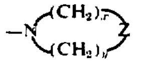

wherein $x$ and $y$ are integers of from 1 to 3; and Z is selected from the group consisting of $CH_2$, O, S and N—$R_4$ wherein $R_4$ is selected from the group consisting of hydrogen, phenyl, benzoyl, carboalkoxy containing from 2 to 5 carbon atoms and alkyl, alkanoyl and alkylsulfonyl each containing from 1 to 4 carbon atoms.

6. The compound of claim 5 wherein $x$ and $y$ are each 2, Z is O and $R_3$ is $(CH_3)_3CCO_2CH_2$—.

7. The compound of claim 5 wherein $x$ and $y$ are each 2, Z is N—$CH_3$ and $R_3$ is $(CH_3)_3CCO_2CH_2$—.

8. The compound of claim 5 wherein $x$ and $y$ are each 2, Z is N—$CH_3$ and $R_3$ is $CH_3CO_3CH_2$—.

9. The compound of claim 5 wherein $x$ and $y$ are each 2, Z is O and $R_3$ is phenacyl.

10. A compound of the formula

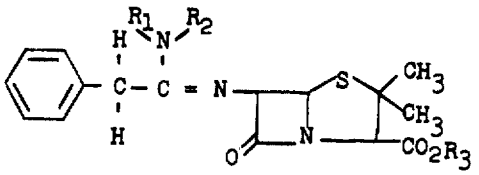

wherein $R_1$ and $R_2$ are each alkyl from 1 to 5 carbon atoms and $R_3$ is H or pivaloyloxymethyl.

11. A compound selected from the group consisting of penicillins having the formula:

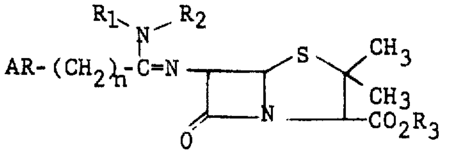

wherein:

AR is selected from the group consisting of phenyl and thienyl;

$n$ is an integer of from 0 to 2;

$R_1$ and $R_2$ when considered separately are each alkyl having from 1 to 5 carbon atoms;

$R_1$ and $R_2$ when taken together form a heterocyclic ring of the formula

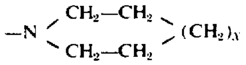

wherein X is an integer of from 1 to 2; or $R_1$ and $R_2$ when taken together may be N-morpholino;

$R_3$ is selected from the group consisting of H and alkanoyloxymethyl having 5 carbon atoms in the alkanoyl portion; and their pharmaceutically acceptable salts.

* * * * *